United States Patent [19]

Zuback

[11] Patent Number: 5,061,302
[45] Date of Patent: Oct. 29, 1991

[54] DISSOLVED GAS STRIPPING APPARATUS

[75] Inventor: Joseph E. Zuback, Camarillo, Calif.

[73] Assignee: Infilco Degremont Inc., Richmond, Va.

[21] Appl. No.: 550,496

[22] Filed: Jul. 10, 1990

[51] Int. Cl.$^5$ ............................................. B01D 19/00
[52] U.S. Cl. ........................................... 55/190; 55/55
[58] Field of Search ........................... 55/55, 189-195

[56] References Cited

U.S. PATENT DOCUMENTS

| | | | |
|---|---|---|---|
| 4,023,941 | 5/1977 | Miller | 55/192 |
| 4,265,753 | 5/1981 | Manuel | 55/192 |
| 4,392,874 | 7/1983 | Yamauchi | 55/194 |
| 4,453,953 | 6/1984 | Tanaka et al. | 55/189 |
| 4,853,006 | 8/1989 | Mangnall | 55/55 |

*Primary Examiner*—Thomas Wyse
*Attorney, Agent, or Firm*—Carroll F. Palmer

[57] ABSTRACT

A method for removal of dissolved gas from water, particularly removal of ozone from water following its treatment with ozone for the purpose of purification, includes the steps of providing an enclosed zone capable of containing a quantity of water, flowing influent water into such zone at a first position thereof to partially fill it leaving a liquid free space within the zone above water contained therein, applying a vacuum to the liquid free space with simultaneous removal of gas from the space, circulating the water within the zone by providing a vertically extending stackpipe within the zone and introducing large bubbles into the stackpipe near the base thereof to create an upward flow of the water through the stackpipe and flowing water out of the zone having a lower ozone content than the ozonized water at a second position of the zone spaced apart from the first position.

Apparatus for carrying out the new method is described.

5 Claims, 1 Drawing Sheet

DISSOLVED GAS STRIPPING APPARATUS

BACKGROUND OF THE INVENTION

1. Field of the Invention

This application relates to apparatus and methods for stripping dissolved gases from water. More particularly, it concerns the degassification of water containing dissolved gases, especially effluent from ozone disinfection of water to obtain potable water.

2. Description of the Prior Art

Ozone is becoming more and more widely used as a disinfection agent for potable water because it has much lower potential for producing trihalomethanes than chlorine now commonly used. It is produced from the oxygen in air or from pure oxygen by passing the air or oxygen through an electrical plasma discharge. (see U.S. Pat. Nos. 996,561 and 4,865,749.)

Not all of the oxygen is converted to ozone so the gas coming from ozone generator will usually contain about 1 to 8% ozone depending on whether air or oxygen is used as the source gas and the power level of the plasma discharge in the generator.

When disinfecting with chlorine, the pure gas is used and the quantities normally used dissolve readily in the water. Because of its solubility, there is little danger that high concentrations of chlorine gas will be present in the air above the water. Although the water storage tanks or basins are covered, the vents need no special consideration because of the chlorine content of the water. When ozone is used as a disinfectant, this is no longer true and special vent provisions must be employed.

The methods of applying ozone are different from those used for chlorine because ozone is only part of the total gas volume used. Usually the ozone-air or ozone-oxygen mixture is admitted to the bottom of a basin referred to as the ozone contact chamber. Gas dissolution is achieved utilizing a network of piping equipped with gas diffusers (see U.S. Pat. Nos. 3,865,039; 3,945,918 and 4,076,617). The small bubbles of gas produced through the diffusers rise through the water in the contact chamber and the component gasses dissolve to essentially their saturation constant for the ambient conditions.

Because ozone is a toxic and corrosive gas, and not all of it and the other component gases are dissolved, special provisions must be made for the containment and removal of the ozone not dissolved. The contact chambers must be equipped with a gas tight cover to allow collection of the off gas and its discharge through a device capable of removing its ozone content.

Ozone contact devices are designed to provide essentially ideal conditions for its dissolution. As a result, each of the component gasses dissolve to essentially their saturation concentration. Later, as the water passes through other portions of the treatment systems, the equilibrium conditions (temperature, pressure) of the water may change. Hence, some of the dissolved gas can come out of solution, resulting in "air binding" of filter beds, pumps, piping, or other equipment. If ozone is added at the beginning of the treatment process, very small gas bubbles released can interfere with the sedimentation process by having tiny bubbles attach themselves to suspended particles causing them to float rather than settle as desired.

In addition to the above considerations, retrofitting an existing water treatment plant with an ozone contact basin can change the hydraulic gradient through such treatment plant. Hence, there may not be sufficient change in elevation to allow the water to flow through the plant without additional pumping.

A substantial number of water treatment plants are changing the disinfecting agent used from chlorine to ozone. For such plants to continue to operate at their best efficiency, it is necessary to reduce the dissolved gas content of the water below the level that causes performance problems in treatment processes. This "gas stripping" can be accomplished by several methods. To insure the dissolved gasses are below saturation level, it is necessary either to heat the water (impractical) or allow it to come in intimate contact with an ambient pressure environment at less than atmospheric pressure. One of the more usual solutions is to pass the water through a vacuum degassifier, i.e., a closed vessel operating at less than atmospheric pressure. The fluid, in this case water, is usually sprayed into such vessel or distributed over packing installed in the vessel to provide the large liquid surface film required for efficient gas transfer.

Although these vacuum degassifiers provide the desired results they are costly to build, install and operate. The vessels are of some height, about 20 feet or more. Pumping is required to elevate the water to the top of the vessel. If spray nozzles are used for efficient distribution of the water, additional pressure losses are generated so additional pump pressure is necessary. Large volumes of water are required to satisfy the requirements of a city, resulting in appreciable equipment size and pumping costs. Hence, there exists a need for a method of reducing the concentration of dissolved gases to the desired level without appreciably affecting the hydraulic gradient in the plant and provide improvement over present practices and substantially reduce pumping costs.

The need to degass water in water treatment plants is not restricted to ozone treated water. Thus, water treatment plants that do not use ozone for disinfection may frequently experience air concentration in their influent as high as 130% of equilibrium saturation. Under such circumstances, filter runs can be reduced 30–50%. Thus, air binding problems in the filter media occurs whenever saturation reaches 108–110%. This is caused by the fact that whenever water that is supersaturated with dissolved gases goes through a filter, the pressure drop through the filter media causes these dissolved gases come out of solution. When this occurs small bubbles are formed that stay within the interctices of the filter media and restrict water flow.

The standard technique for reducing gas saturation, namely, dropping the water 4–6 feet over a weir, results in a high head loss which can not be accepted in many existing plants. Hence, a need exists to enable influent water to be economically degassed without creating any substantial head loss. The present invention addresses this problem and supplies new apparatus and methods to help solve it.

OBJECTS

A principal object of the invention is the provision of improved apparatus and methods for stripping dissolved gases from liquids containing same.

A further object is the provision of new apparatus and methods for reducing the concentration of dissolved ozone and related gases in ozone treated water to the desired level without appreciably affecting the hydraulic gradient present in the degassing system.

Another object is the provision of apparatus and methods that may be retrofit into existing water treatment plants having virtually no tolerance for increases in headloss.

Other objects and further scope of applicability of the present invention will become apparent from the detailed descriptions given herein; it should be understood, however, that the detailed descriptions, while indicating preferred embodiments of the invention, are given by way of illustration only, since various changes and modifications within the spirit and scope of the invention will become apparent from such descriptions.

SUMMARY OF THE INVENTION

The objects are accomplished, in part, in accordance with the invention by the provision of apparatus for removal of dissolved gases from water, particularly ozone from water following its ozonation, which comprises (a) an enclosed chamber, (b) means for flowing the water into the chamber to partially fill it leaving a liquid free space within the chamber above water contained therein, (c) means for applying a vacuum to the liquid free space with simultaneous removal of gas from the space, (d) water circulating means within the chamber comprising a vertically extending stackpipe and large bubble generator means for generating an upward flow of water through the stackpipe and (e) means for removing water from the chamber.

In preferred embodiments, the means for applying a vacuum includes means for removal of ozone from the gas removed from the liquid free space, e.g., by separation of the ozone from the gas or by the destruction of the ozone.

The objects are further accomplished in accordance with the invention by the provision of a method for removal of dissolved gases from water, particularly ozone and related gases following water ozonation, which comprises flowing the gas containing water into an enclosed zone to partially fill it leaving a liquid free space within the zone above water contained therein, applying a vacuum to the liquid free space with simultaneous removal of gas from the space, circulating the water within the zone by providing a vertically extending stackpipe within the zone and introducing large bubbles into the stackpipe near the base thereof to create an upward flow of the water through the stackpipe and removing water from the zone having a lower dissolved gas content than the influent water.

BRIEF DESCRIPTION OF THE DRAWINGS

A more complete understanding of the invention can be obtained by reference to the accompanying drawings in which.

DESCRIPTION OF THE PREFERRED EMBODIMENTS

Figure 1:
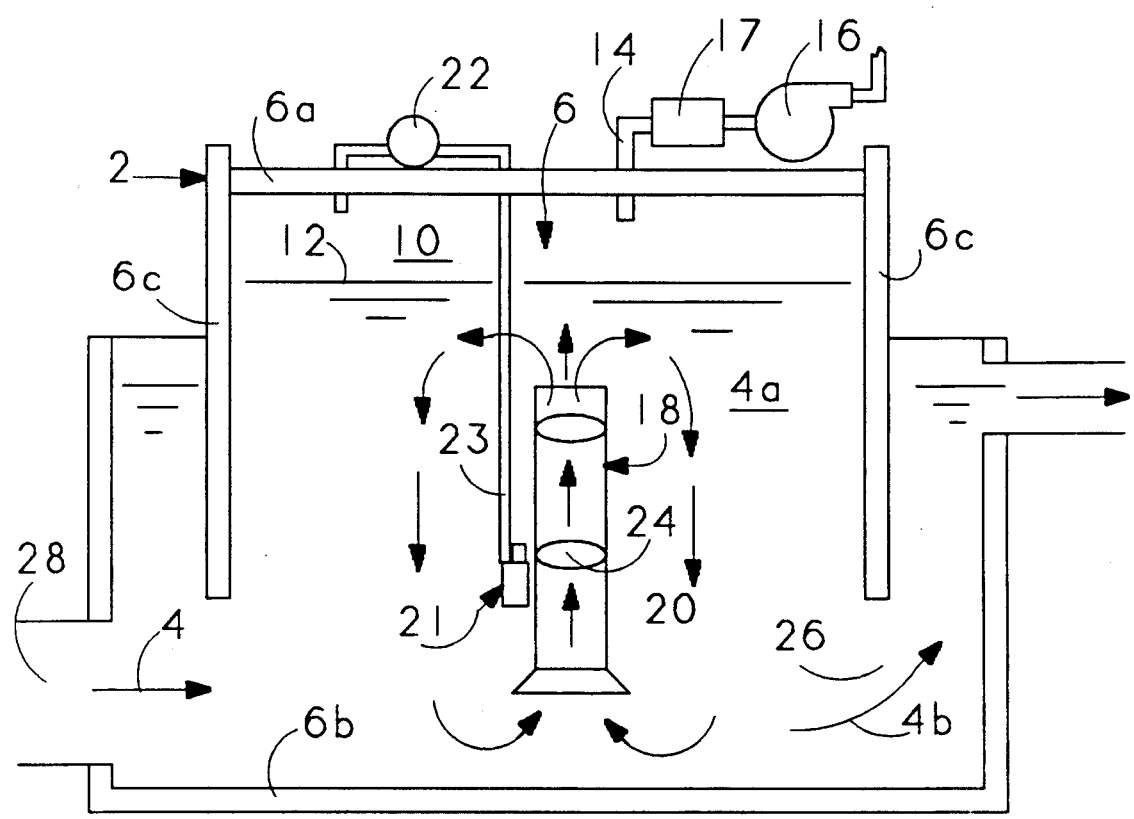
FIG. 1 is a diagramatic lateral, sectional view of apparatus of the invention.

Apparatus 2 for removal of ozone from influent water 4 following its ozonation comprises an enclosed chamber 6 having an inlet 8 for flowing the water into chamber 6 to partially fill it leaving a liquid free space 10 above water level 12. The chamber 6 includes a top 6a, a bottom 6b and one or more sides 6c.

A conduit 14 into chamber 6 communicates with the space 10 and a vacuum pump 16 is connected via ozone removal unit 17 to conduit 14 to apply a vacuum to the space 10 with simultaneous removal of gas therefrom.

The ozone removal unit 17 may be varied. Thus, it can be a device that destroys ozone by electrical or chemical action or it can be a device that separates ozone from the related gases thereby enabling it to be recycled for use in the ozonation of water to create more influent water 4. Such distruction or separation.

Water circulating means 18 within chamber 6 comprises a vertically extending stackpipe 20 and means 21 including compressor 22 and conduit 23 for generating large gas bubbles 24 that produce an upward flow of water 4a through the stackpipe 20.

Water circulating means 18 may take a variety of forms as disclosed in U.S. Pat. Nos. 4,187,263; 4,293,506; 4,356,131 and 4,569,804, the disclosures of which are incorporated herein by reference. Also, by way of example, compressor 22 may be omitted and gas needed to form the bubbles 24 can be obtained by using a slipstream from the discharge of the vacuum pump 16 to supply gas to conduit 23.

An outlet 26 spaced apart from inlet 8 is provided for removing water 4b having a lower ozone content than influent water 4 from the chamber 28.

In use of the apparatus 2 for removal of ozone and other gas from water 4 following its treatment with ozone for the purpose of purification, the ozonized water 4 flows into chamber 6 to partially fill it leaving a liquid free space 10 within the zone above water level 12. A vacuum is applied to the space 10 with simultaneous removal of gas from the space by the vacuum pump 16.

The water 4 is caused to circulate in the chamber 6 by introducing large bubbles 24 into the stackpipe 20 thereby producing an upward flow of the water 4a through the stackpipe 20. This circulation action in combination with the vacuum application serves to efficiently remove ozone and other dissolved gases from the water 4a producing water 4b having a lower ozone content than the ozonized water 4a. Such degassed water 4b is removed through outlet 26 for storage or further treatment, e.g., passage through filter media (not shown) as a further step in the production of potable water.

The embodiments of the invention in which an exclusive property or privilege is claimed are defined as follows:

1. Apparatus for removal of dissolved gas from water which comprises:
   an enclosed chamber defined by a top, a bottom and one or more sides,
   an inlet into said chamber adjacent said bottom for flowing said water into said chamber,
   an outlet in said chamber adjacent said bottom spaced apart from said inlet for removing water from said chamber,
   a stackpipe within said chamber extending vertically between a lower plane adjacent said chamber bottom and an upper plane approaching, but beneath said chamber top,
   water in said chamber filling it to a water level above said upper plane, but below said chamber top leaving a liquid-free space between said water level and said chamber top,
   a conduit into said chamber adjacent said top communicating with said liquid free space, a vacuum pump connected to said conduit to apply a vacuum to said liquid-free space with simultaneous removal of gas from said space, and large bubble generator means within said chamber for generating within said stackpipe a series of large, spaced apart bubbles that create an upward flow of water through said stackpipe thereby causing water to circulate within said chamber.

2. The apparatus of claim 1 wherein said means for applying a vacuum includes means for removal of ozone from said gas drawn from said liquid-free space.

3. The apparatus of claim 1 which includes means to destroy ozone present in said gas drawn from said liquid-free space.

4. Apparatus for removal of dissolved gas from water which comprises:

an enclosed chamber defined by a top, a bottom and one or more sides, an inlet into said chamber adjacent said bottom for flowing said water into said chamber, an outlet in said chamber adjacent said bottom spaced apart from said inlet for removing water from said chamber, a stackpipe within said chamber extending vertically between a lower plane adjacent said chamber bottom and an upper plane approaching, but beneath said chamber top, water in said chamber filling it to a water level above said upper plane, but below said chamber top leaving a liquid-free space between said water level and said chamber top, a conduit into said chamber adjacent said top communicating with said liquid-free space, a vacuum pump connected to said conduit to apply a vacuum to said liquid free space with simultaneous removal of gas from said space, large bubble generator means within said chamber for generating within said stackpipe a series of large, spaced apart bubbles that create an upward flow of water through said stackpipe thereby causing water to circulate within said chamber and means to supply said generator means with compressed gas.

5. The apparatus of claim 4 wherein said means to supply is an air compressor.

* * * * *